April 5, 1966  J. ALBERANI  3,244,007
PRESSURE RATIO MEASURING DEVICE
Filed March 19, 1962  3 Sheets-Sheet 1

INVENTOR.
JULIUS ALBERANI
BY Whittemore
Hulbut & Belknap
ATTORNEYS

April 5, 1966   J. ALBERANI   3,244,007
PRESSURE RATIO MEASURING DEVICE
Filed March 19, 1962   3 Sheets-Sheet 2

INVENTOR.
JULIUS ALBERANI
BY
ATTORNEYS

INVENTOR.
JULIUS ALBERANI
BY
ATTORNEYS.

United States Patent Office 3,244,007
Patented Apr. 5, 1966

3,244,007
PRESSURE RATIO MEASURING DEVICE
Julius Alberani, Birmingham, Mich., assignor to Holley Carburetor Company, Warren, Mich., a corporation of Michigan
Filed Mar. 19, 1962, Ser. No. 180,446
8 Claims. (Cl. 73—407)

The invention relates to pressure responsive devices and refers more specifically to apparatus for sensing and indicating the ratio of two pressures.

In the past pressure ratio indicators have been relatively complicated. Thus their weight and expense has precluded their use on small aircraft and in other installations where weight and expense has been sufficiently important. Prior pressure ratio indicators which have been relatively uncomplicated have been deficient in that they have usually also been inefficient, inaccurate or unreliable.

It is, therefore, one of the objects of the present invention to provide improved means for sensing and indicating the ratio between two pressures.

Another object is to provide a pressure ratio indicator comprising means for sensing two pressures and means responsive to the pressure sensing means for producing a linear movement proportional to the ratio between the sensed pressures.

Another object is to provide a pressure ratio indicator including first pressure responsive means movable in accordance with the difference between two pressures and the movement of a second pressure responsive means, said second pressure responsive means being movable in accordance with the movement of the first pressure responsive means and the magnitude of one of the two pressures and means responsive to movement of the second pressure responsive means for providing an indication of the ratio of the pressures.

Another object is to provide a pressure ratio indicator including a first lever pivotally mounted at one end, a bellows responsive to the difference of two pressures for applying a force to the other end of the lever proportional to the difference between the two pressures, a second lever pivotally mounted at one end, a second bellows responsive to one of the two pressures for applying a force to the other end of the second lever proportional to the one of the two forces, linearly movable means for applying identical forces to both levers at variable positions therealong, means responsive to the movement of the second lever for producing a third pressure representative of the ratio between the first and second pressures, and means responsive to the third pressure for producing a proportional movement of the linearly movable means.

Another object of the invention is to provide a pressure ratio indicator including a first pivotally mounted lever having a pair of perpendicularly extending arms, a first bellows responsive to a first pressure for applying a first force to one of the arms of the first lever, a second bellows responsive to the difference of the first pressure and a second pressure for applying a second force to the other arm of the first lever, a second pivotally mounted lever, a third bellows responsive to the second pressure for applying a force to the second lever, linearly movable means for applying another force to both the other arm of the first lever and the second lever at a variable position longitudinally thereof, means responsive to the movement of the second lever for producing a third pressure representative of the ratio between the first and second pressures and means responsive to the third pressure for producing movement of the linearly movable means linearly proportional to the ratio of the first and second pressures.

Another object is to provide a pressure ratio indicator including a first lever pivotally mounted at one end, a bellows responsive to the difference of two pressures for applying a force to the other end of the lever proportional to the difference between the two pressures, a second lever pivotally mounted at one end and extending perpendicularly to the direction of extension of the first lever, a second bellows responsive to one of the two pressures for applying a force to the other end of the second lever proportional to the one of the two pressures, linearly movable means for applying identical forces to the first lever at variable positions along the length thereof and to the second lever at a fixed position along the length thereof, means responsive to the movement of the first lever for producing a third pressure representative of the ratio between the first and second pressures, and means responsive to the third pressure for producing a proportional movement of the linearly movable means.

Another object is to provide a pressure ratio indicator which is simple in construction, economical to manufacture and efficient in use.

Other objects and features of the invention will become apparent as the description proceeds, especially when taken in conjunction with the accompanying drawings, illustrating preferred embodiments of the invention, wherein.

With particular reference to the figures of the drawings one embodiment of the invention will now be disclosed.

Figure 1:
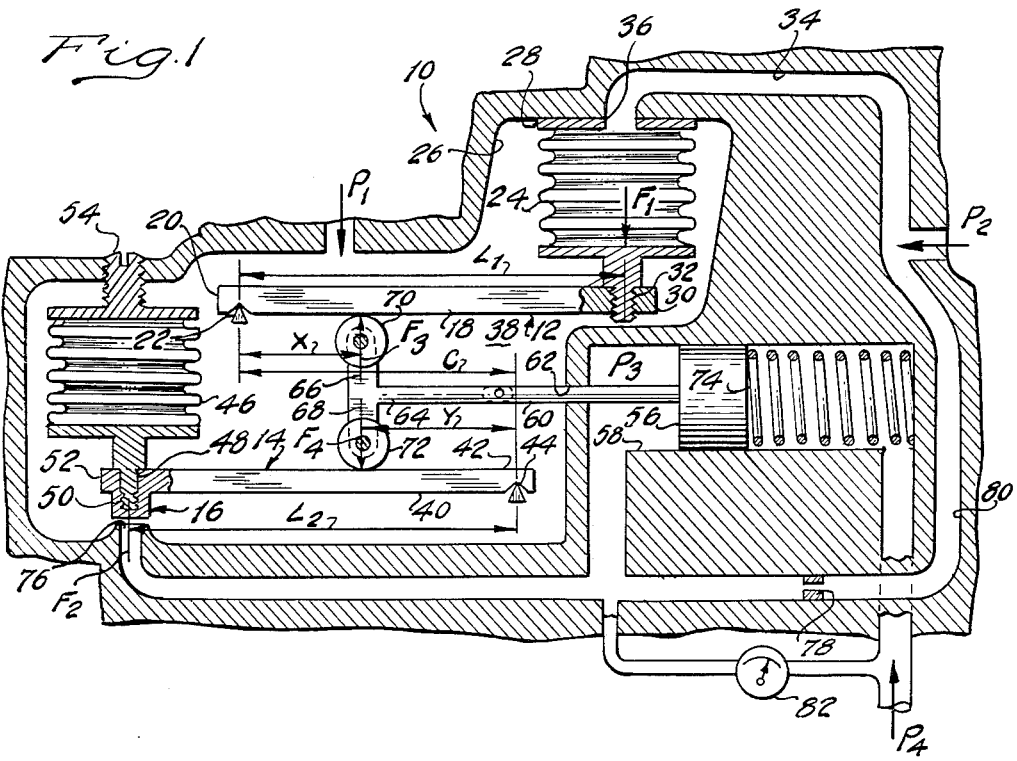
FIGURE 1 is a diagrammatic representation of a pressure ratio indicator constructed in accordance with the invention.

The pressure ratio indicator 10 illustrated in FIGURE 1 includes a first pressure responsive means 12 responsive to the difference between two pressures $P_1$ and $P_2$ and to a second pressure responsive means 14, which second pressure responsive means is responsive to pressure $P_1$ and the pressure responsive means 12. The pressure responsive means 14 is operable to control the valve assembly 16 to provide a third pressure $P_3$ which is proportional to the pressure ratio $P_2/P_1$.

More specifically the pressure responsive means 12 comprises the lever 18 pivotally mounted at end 20 on pivot means 22 as shown in FIGURE 1. The bellows 24 which as shown in FIGURE 1 is secured at one end to the pressure ratio indicator housing 26 by mounting plate 28 and at the other end to the end 30 of the lever 18 by convenient means such as the threaded connection 32 is also a part of the pressure responsive means 12.

In operation the interior of the bellows 24 is exposed to the larger input pressure $P_2$ of the pressure ratio indicator 10 through the passage 34 in the housing 26 and the opening 36 in the plate 28. On the exterior the bellows 24 is exposed to the lower input pressure $P_1$ of the pressure ratio indicator 10 which pressure is present in the housing chamber 38. The pressure difference $P_2-P_1$, therefore, produces a force $F_1$ acting on end 30 of lever 18.

Thus on an increase of $P_2$ pressure with respect to the $P_1$ pressure or a decrease in the $P_1$ pressure with respect to the $P_2$ pressure the bellows 24 tends to expand and pivot the lever 18 about the pivot mounting 22 thereof. Conversely of course if the pressure $P_2$ were reduced with respect to the pressure $P_1$ or the pressure $P_1$ increased with respect to the pressure $P_2$ the lever 18 would be rotated in a counterclockwise direction due to contraction of the bellows 24.

The pressure sensing means 14 includes the lever 40 pivotally mounted at end 42 thereof on the pivotal mounting means 44 and secured to the bellows 46 by convenient means such as the reduced diameter stud 48 carried by the bellows 46 and the threaded connection between the valve member 50 of the valve assembly 16 and the stud 48. Bellows 46 besides being connected to the end 52 of the lever 40 at one end is adjustably connected at the other end to the housing 26 by the threaded connection 54 therebetween. The bellows 46 is evacuated so that on an increase in pressure $P_1$ the bellows 46 tends to collapse whereby the lever 40 is subjected to a force $F_2$ tending to rotate the lever 40 in a clockwise direction. Conversely if the pressure $P_1$ decreases the bellows 46 tends to pivot the lever 40 in a counterclockwise direction.

The piston 56 which is reciprocally mounted in the cylindrical bore 58 within the housing 26 is rigidly secured to a piston rod 60 which extends through a sealed passage 62 between the bore 58 and the chamber 38. The piston rod 60 has on its end 64 oppositely extending arms 66 and 68 which mount the rollers 70 and 72 on the opposite ends thereof respectively. The rollers 70 and 72 as shown in FIGURE 1 are in contact with the levers 12 and 14 respectively and transfer forces $F_3$ and $F_4$ therebetween due to pivoting of the levers in response to the sensed pressures $P_2$ and $P_1$.

It will be obvious that as the piston 56 moves reciprocally in the bore 58 that the position of the rollers 70 and 72 longitudinally of the levers 18 and 40 changes. Therefore, the position at which forces are applied to the levers 18 and 40 by the rollers 70 and 72 is determined by the movement of the piston 56.

Movement of the piston 56 is determined by the pressure $P_3$ in the cylindrical bore 58, the atmospheric pressure $P_4$ and the pressure exerted on the piston 56 by the spring 74. The pressure $P_3$ is a function of the distance between the valve seat 76 and the valve member 50 of the valve assembly 16, the difference in pressures $P_1$ and $P_2$ and the restriction 78 in the conduit 80 across which the pressure $P_2$ is reduced to the pressure $P_3$. Thus it will be seen that the pressure $P_3$ for a fixed restriction 78 and a particular pressure difference is directly dependent upon the position of the lever 40 since the valve member 50 of the valve assembly 16 is secured to the end 52 of the lever 40.

In over-all operation of the pressure ratio indicator 10 if the pressure $P_1$ remains constant and pressure $P_2$ is increased the bellows 24 will be caused to expand whereby lever 18 will be pivoted clockwise and the lever 40 will be pivoted counterclockwise due to the forces $F_3$ being transferred through the roller 70, the arms 66 and 68 and roller 72 from the lever 18 to the lever 40 as the equal force $F_4$. The valve 50 of the valve assembly 16 will therefore more nearly close the valve structure 16 so that the pressure $P_3$ will be increased toward pressure $P_2$ as a limit.

Increase of pressure $P_3$ will produce movement to the right of the piston 56 in opposition to the resilient spring 74 and atmospheric pressure $P_4$ so that the point of application of the forces $F_3$ and $F_4$ to the levers 18 and 40 will be moved to the right in FIGURE 1. The movement of the piston 56 will continue until the force $F_3$ is applied to the lever 18 at a point therealong to place the lever 18 in equilibrium with the force $F_1$ applied to the lever 18 by the bellows 24. The movement of the piston 56 will be proportional to the pressure ratio $P_2/P_1$.

Similarly if the pressure $P_2$ is decreased the bellows 24 will tend to contract whereby the force $F_1$ will tend to produce a counterclockwise movement of the lever 18 and a consequent clockwise movement of the lever 40. Clockwise movement of the lever 40 will open the valve assembly 16 to decrease the pressure $P_3$ toward the pressure $P_1$ as a limit. Decreasing of the pressure $P_3$ will cause movement of the piston 56 to the left in FIGURE 1 until the rollers 70 and 72 engage the levers 18 and 40 in a position whereat the system is again in equilibrium. Again the movement of the piston 56 will be proportional to the pressure ratio $P_2/P_1$.

Reducing the pressure $P_1$ would have a similar effect to the increasing of pressure $P_2$ and increasing pressure $P_1$ would have an effect on the system of FIGURE 1 similar to that of decreasing the pressure $P_2$. Again the pressure $P_3$ and the movement of the piston 56 will be proportional to the pressure ratio $P_2/P_1$. Thus the pressure ratio $P_2/P_1$ may be indicated by the indicator 82 which is connected between the pressure $P_3$ in the cylindrical bore 58 and atmospheric pressure $P_4$.

That the movement of the piston 56 is proportional to the pressure ratio $P_2/P_1$ will be recognized from the following computations.

Taking the sum of the moments about the pivot means 22 acting on the lever 18 it can be seen that $F_1L_1$ must be equal to $F_3X$ and taking the sum of the moments about the pivot means 44 of the forces acting on the lever 40 it will be seen that $F_2L_2$ is equal to $F_4Y$. Further considering the area of the bellows 24 to be equal to $A_{B1}$ it will be seen that $F_1$ is equal to $(P_2-P_1)A_{B1}$. Similarly considering the area of the bellows 46 to be $A_{B2}$ the force $F_2$ will be equal to $P_1A_{B2}$. Therefore, since the forces $F_3$ and $F_4$ must be equal because the arms connecting the rollers 70 and 72 are solid, the following equation results $$\frac{(P_2-P_1)A_{B1}L_1}{X} = \frac{P_1 A_{B2} L_2}{Y} \qquad (1)$$

Further if $A_{B2}$ is chosen equal to $A_{B1}$ and the length $L_2$ is chosen to be equal to the length $L_1$, as they are, the Equation (1) may be reduced to the following $$\frac{P_2-P_1}{P_1} = \frac{X}{Y} \qquad (2)$$

Furthermore, considering $P_2$ and $P_1$ as absolute pressures, due to the physical construction of the pressure ratio indicator 10 as illustrated in FIGURE 1 X is equal to $C-Y$. At equilibrium conditions Equation (3), therefore, results.

$$Y = \frac{C}{\frac{P_2}{P_1}} \qquad (3)$$

In accordance with Equation (3) it will therefore be seen that the distance Y which the piston 56 is moved due to a change in pressures $P_2$ or $P_1$ will be proportional to the pressure ratio $P_2/P_1$. Therefore the pressure ratio $P_2/P_1$ may be indicated by convenient means such as the indicator 82 connected between the pressure $P_3$ which is also a function of the movement of the piston 56 and atmospheric pressure $P_4$.

Figure 2:
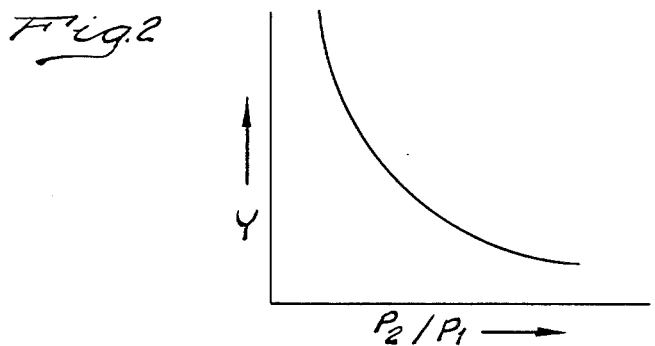
FIGURE 2 is a graphical representation of the linear movement produced in the pressure ratio indicator shown in FIGURE 1 with respect to the ratio of the two pressures sensed by the pressure ratio indicator.

It will be understood however that the meter 82 must be calibrated non-linearly since the movement of the piston 56 will not be linearly proportional to the pressure ratio $P_2/P_1$ as indicated by Equation (3). The relation between the movement of the piston 56 and the pressure $P_3$ to the pressure ratio $P_2/P_1$ is illustrated graphically in FIGURE 2.

Figure 3:
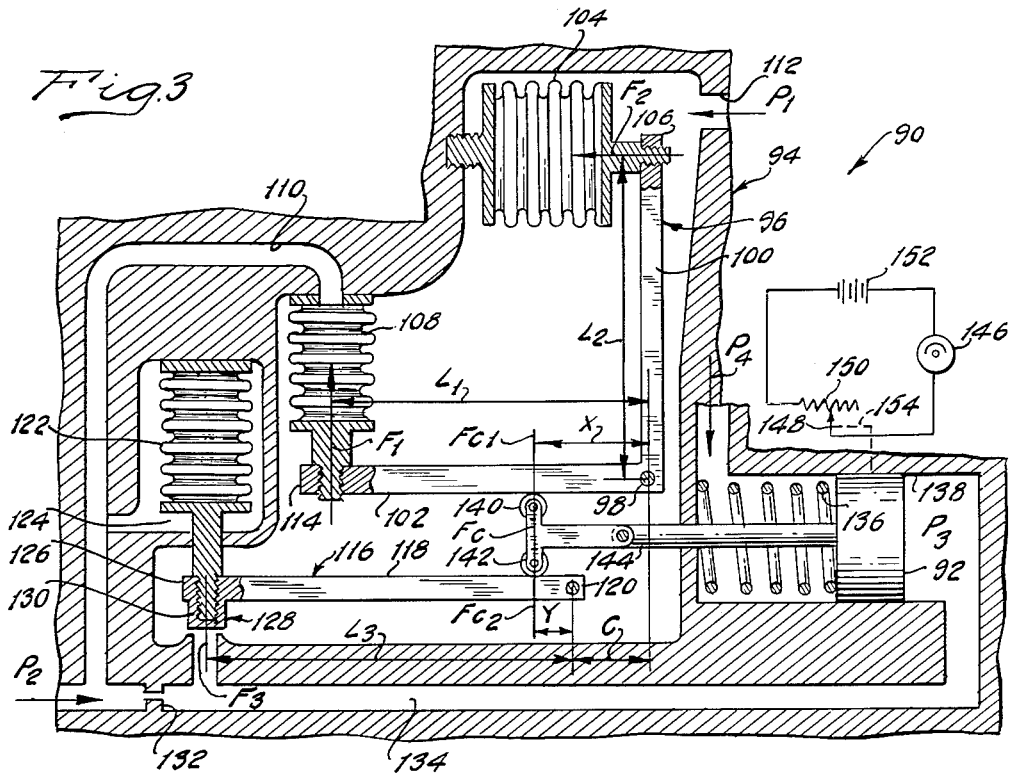
FIGURE 3 is a diagrammatic illustration of a modification of the pressure ratio indicator illustrated in FIGURE 1.
Figure 4:
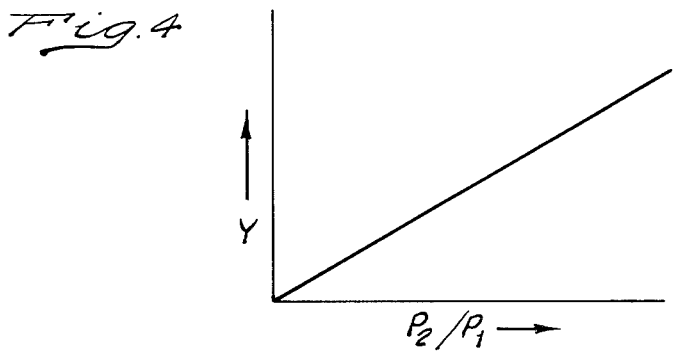
FIGURE 4 is a graphical representation of the linear movement produced in the pressure ratio indicator shown in FIGURE 3 with respect to the ratio of the two pressures sensed by the pressure ratio indicator.

The modified pressure ratio indicator 90 illustrated in FIGURE 3 is provided to produce a linear movement of the piston 92 with relation to the pressure ratio $P_2/P_1$ as illustrated in the graph of FIGURE 4.

In the modified pressure ratio indicator 90 the first pressure responsive means 94 includes the lever 96 pivotally mounted centrally on pivotal mounting means 98 and having the arms 100 and 102 extending perpendicularly to each other. The first pressure responsive means 94 further includes the evacuated bellows 104 secured to the end 106 of the arm 100 of lever 96 and the bellows 108 exposed interiorly to the pressure $P_2$ through passage 110 and connected to the end 114 of the arm 102 of lever 96. Both bellows 104 and 108 are exposed exteriorly to the pressure $P_1$ through the passage 112.

The second pressure responsive means 116 includes the lever 118 pivotally mounted on pivot pin 120 at one end and secured to the evacuated bellows 122 which is exteriorly exposed to the pressure $P_2$ in chamber 124 at the other end 126.

The valve structure 128 including the valve member 130 secured to the end 126 of lever 118 is again operable to control the pressure $P_3$ in conjunction with the restriction 132 in the passage 134 between maximum and minimum values determined by the values of pressures $P_2$ and $P_1$ respectively. Pressure $P_3$ in turn in conjunction with the constant rate spring 136 determines the position of the piston 92 within the cylindrical bore 138 provided therefor. The position of the piston 92 determines the point of application of the forces $F_C$ on the levers 96 and 116 due to the movement of the rollers 140 and 142 with the piston rod 144 as before.

In teh modified structure of FIGURE 3 the pressure ratio $P_2/P_1$ is registered on the ammeter 146 due to the movement of the wiper arm 148 on the linear resistance potentiometer 150 which is in series circuit with the regulated direct current voltage source 152 and the ammeter 146. The piston 92 is mechanically connected to the wiper arm 148 as indicated at 154 in FIGURE 3.

The operation of the modified pressure ratio indicator of FIGURE 3 is similar to the operation of the pressure ratio indicator of FIGURE 1. Thus assuming the pressure $P_2$ is increased while the pressure $P_1$ remains constant the lever 118 is caused to move in a clockwise direction and to force the lever 102 to move in a clockwise direction due to the differences in the distance X and Y since the force $F_{C2}$ must increase faster than the force $F_{C1}$ in order to balance the change in the forces $F_3$ and $F_1$ applied to the ends 126 and 114 of the levers 118 and 102 respectively. The clockwise movement of lever 118 causes the valve structure 128 to open more whereby the pressure $P_3$ is reduced. The spring 136 then causes movement of the piston 92 and, therefore, the rollers 140 and 142 in a rightward direction until the levers 102 and 118 are again in equilibrium. Obviously a reduction in pressure $P_2$ will cause an opposite movement of the piston 92.

Similarly an increase in the pressure $P_1$ will produce a counterclockwise movement of the lever 96 due to the area of the bellows 104 being twice that of the bellows 108. The lever 118 is therefore forced to move in a counterclockwise direction along with the lever 96 due to the forces transferred therebetween through the rollers 140 and 142. Counterclockwise movement of the lever 118 more fully closes the valve structure 128 to raise the pressure $P_3$ and thereby produce movement of the piston 92 in a leftward direction until equilibrium is again established. Obviously a decrease in pressure $P_1$ will produce the opposite results.

That the movement of the piston 92 is linearly proportional to the pressure differential $P_2/P_1$ as shown in FIGURE 4 will be readily appreciated on considering the following.

On taking the sum of the moments about the pivot point 98 of the forces acting on the lever 100 it will be seen that $F_{C1}X$ is equal to $(P_2-P_1)B_{A1}L_1 + P_1B_{A2}L_2$ where $B_{A1}$ and $B_{A2}$ are the areas of the bellows 108 and 104 respectively. Similarly taking the sum of the moments about the pivot point 120 acting on the lever 118 it will be seen that $F_{C2}Y$ is equal to $P_2B_{A3}L_2$ where $B_{A3}$ is the area of bellows 122. Further it will be understood that $F_{C1}$ and $F_{C2}$ are equal so that the following equation results;

$$P_2B_{A1}L_1 - P_1B_{A1}L_1 + P_1B_{A2}L_2 = \frac{P_2B_{A3}L_3}{Y} \quad (4)$$

In Equation (4) if we choose $L_1$, $L_2$ and $L_3$ equal and further choose $B_{A3}$ equal to $B_{A1}$, and $B_{A2}$ equal to $2B_{A1}$, the following equation results;

$$\frac{X}{Y} = \frac{P_2 + P_1}{P_2} \quad (5)$$

Further since X is equal to $Y+C$ due to the geometry of the pressure ratio indicator 90 of FIGURE 3 it will be apparent that Equation (6) results from Equation (5).

$$Y = \frac{P_2}{P_1} C \quad (6)$$

From inspection of Equation (6) it will be readily understood that the distance Y which the piston 92 moves on a change in either the pressure $P_1$ or $P_2$ is linearly proportional to the pressure ratio $P_2/P_1$ as shown in FIGURE 4. Thus if the resistor 150 is linear and the mechanical linkage 154 provides a linear translation of movement between the piston 92 and the wiper arm 148 the ammeter 146 in accordance with Ohm's law may be calibrated in terms of $P_2/P_1$.

Figure 5:
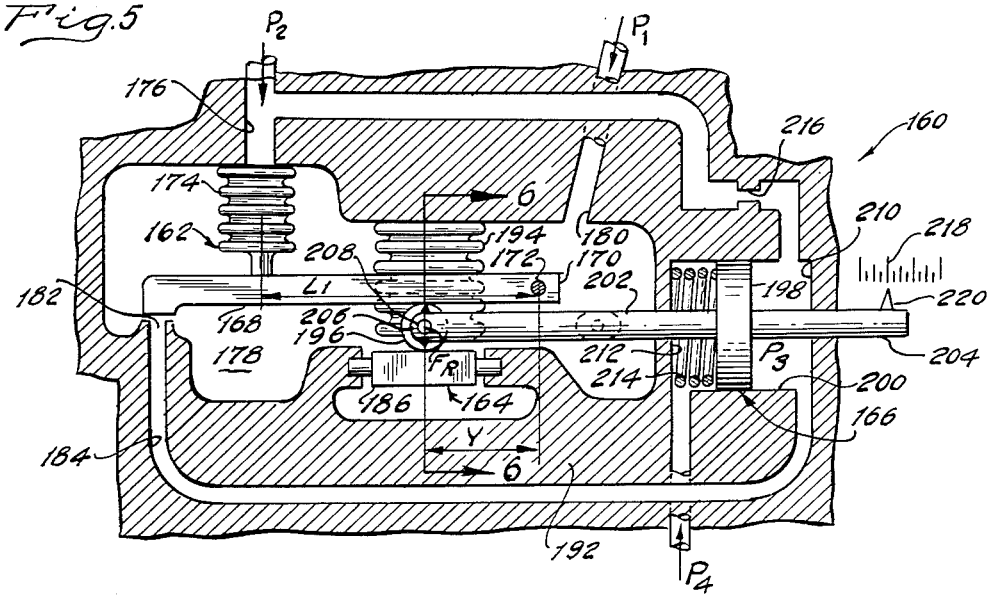
FIGURE 5 is a diagrammatic illustration of another modification of the pressure ratio indicator illustrated in FIGURE 1.
Figure 6:
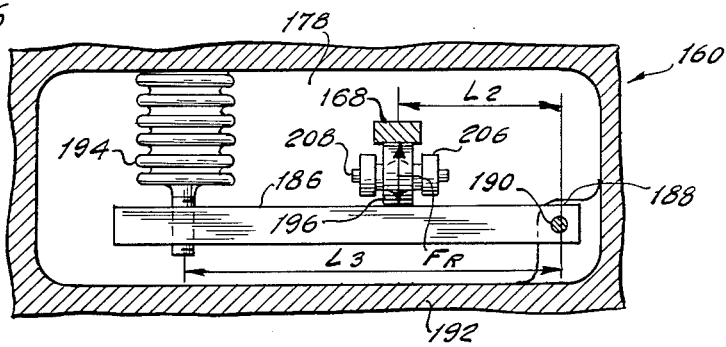
FIGURE 6 is a partial section view of the pressure ratio indicator illustrated in FIGURE 5 taken substantially on the line 6—6 of FIGURE 5.

The modified pressure ratio indicator 160 illustrated in FIGURES 5 and 6 includes the first pressure responsive means 162 and the second pressure responsive means 164 extending substantially perpendicularly to the first pressure responsive means 162. The modified pressure ratio indicator 160 is operable to produce a linear movement of the piston means 166 with relation to the pressure ratio $P_2/P_1$.

The first pressure responsive means 162 includes the lever 168 pivotally mounted at end 170 on pivot mounting 172. The bellows 174 having an area $A_{B1}$ is connected to the lever 168 at a fixed distance $L_1$ from the pivot mounting means 172 as shown best in FIGURE 5. Bellows 174 is exposed interiorly to pressure $P_2$ through the passage 176. Exteriorly the bellows 174 is exposed to pressure $P_1$ maintained in the chamber 178 through passage 180. The lever 168 is operable to control the valve orifice 182 from passage 184 on pivotal movement thereof about the pivot mounting 172.

The second pressure responsive means 164 includes the lever 186 extending perpendicularly to the lever 168 and pivotally mounted at end 188 by pivot mounting means 190 in the housing 192 as shown best in FIGURE 5. The evacuated bellows 194 having the area $A_{B2}$ is secured to the other end of the lever 186 at a fixed distance $L_3$ from the pivotal mounting 190 thereof. As shown best in FIGURE 5 the lever 186 is of considerable width whereby the roller 196 is supported thereby for movement transverse thereof at a fixed distance $L_2$ from the pivot mounting 190 of the lever 186.

The roller 196 is a part of the piston means 166 and transfers a force $F_R$ between the levers 186 and 168. The force $F_R$ as indicated is applied to the lever 186 at a constant distance $L_2$ from the pivot mounting 190 thereof while the same force $F_R$ is applied to the lever 168 at a variable distance Y from the pivot mounting 172 thereof.

The piston means 166 includes the piston 198 reciprocally mounted in the cylindrical chamber 200 and connected to the piston rod 202 and indicator rod 204 as shown best in FIGURE 5. The end 206 of the piston rod 202 is bifurcated as shown best in FIGURE 6 and supports the roller 196 between the bifurcated portions thereof on the pin 208 whereby the roller is caused to move axially of the lever 168 and transversely of the lever 186 in accordance with the movement of the piston 198.

The movement of the piston 198 is caused by the pressure $P_3$ in the part 210 of the cylindrical chamber 200 as related to the pressure $P_4$ in the part 212 of the chamber 200 in conjunction with the biasing spring 214. Pressure $P_4$ may be, for example, atmospheric pressure. The biasing spring 214 is provided to urge the piston 198 to the right as shown in FIGURE 5 since pressure $P_4$ will always be less than pressure $P_3$.

The pressure in the part 210 of the cylindrical chamber 200 will be caused by flow through the restriction 216 which in turn is controlled by the flow through the valve orifice 182. Thus, it will be seen that the movement of the piston 198 will be controlled by the movement of the lever 168 and the pressure $P_3$ will vary between the pressure $P_2$ and the pressure $P_1$ as limits.

Figure 7:
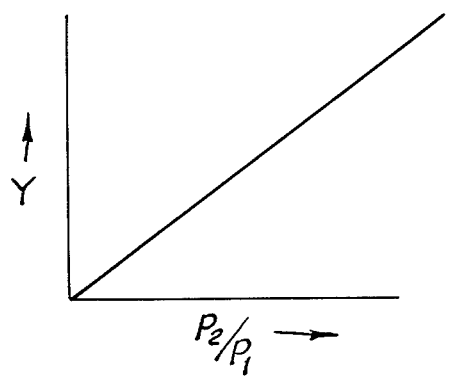
FIGURE 7 is a graphical representation of linear movement produced in the pressure ratio indicator shown in FIGURE 5 with respect to the ratio of the two pressures sensed by the pressure ratio indicator.

As a result of the movement of the piston 198 the pressure ratio $P_2/P_1$ may be indicated on the scale 218 by the indicating finger 220 carried by and movable with the indicator rod 204. Further in accordance with the modification of the invention illustrated in FIGURES 5 and 6 the movement of the piston 198 is linearly proportional to the pressure ratio $P_2/P_1$ as illustrated in FIGURE 7.

The linear relationship between the movement of the piston 198 and the pressure ratio $P_2/P_1$ may be shown mathematically by taking the sum of the moments about the pivotal mounting means 172 and 199 of the levers 168 and 186 respectively due to the forces acting thereon applied thereto by the bellows 174 and 194 respectively and the roller 196 as before. On taking the sum of the moments about the pivot point 172 due to the forces acting on the lever 168 Equation (7) results $$(P_2-P_1)A_{B1}L_1 = F_R Y \qquad (7)$$

Further taking the sum of the moments about the pivotal mounting means 190 of the forces acting on the lever 186 Equation (8) results $$P_1 A_{B2} L_3 = F_R L_2 \qquad (8)$$

Solving for $F_R$ in Equation (8) and substituting the result in Equation (7) and solving for Y in the resulting equation the following Equation (9) results $$Y = \left(\frac{P_3}{P_1} - 1\right)\frac{A_{B2}L_3}{A_{B1}L_1 L_2} \qquad (9)$$

Thus in accordance with FIGURE 7 it will be seen that the distance Y which is the distance of movement of the piston 198 is linearly proportional to the pressure ratio $P_2/P_1$.

It will be readily understood that the ratio $P_2/P_1$ can similarly be made linearly proportional to the movement of the piston 198 if in a construction such as that shown in FIGURE 1 the lever 40 is turned perpendicularly to the lever 18 rather than turning the lever 18 perpendicularly to the lever 40 substantially as has been accomplished in the modification of the pressure ratio indicator of the invention illustrated in FIGURES 5 and 6.

While one embodiment of the present invention and modifications thereof have been disclosed in detail other embodiments and modifications of the invention are contemplated. Thus it is the intention to include all embodiments and modifications of the invention defined by the appended claims within the scope of the invention.

What I claim as my invention is:

1. A pressure ratio indicator comprising first pressure responsive means movable in accordance with sensed pressures including a first pressure responsive bellows and a first lever pivotally mounted at one end and connected to the pressure responsive bellows at the other end, second pressure responsive means movable in accordance with sensed pressures including a second pressure responsive bellows and a second lever pivotally mounted at one end and secured to the second bellows at the other end, linearly movable means operably associated with both the pressure responsive means for transferring forces between said levers at a variable location longitudinally of only one of said levers and at a fixed location longitudinally of the other of said levers including a force transfer member extending between said levers and roller means secured to and carried by the force transfer member engageable with said levers, means responsive to movement of one of said levers for producing a pressure proportional to the ratio of the pressures sensed by the pressure responsive means and means for moving the linearly movable means a distance linearly proportional to the ratio of the sensed pressures in direct response to the produced pressure.

2. Structure as set forth in claim 1 wherein the means for producing a pressure proportional to the ratio of the pressures sensed comprises a restricted passage connected to one of the pressures sensed and valve means at one end of the restricted passage for restricting the end opening of the restricted passage in accordance with the position of one of the levers.

3. Structure as set forth in claim 1 wherein the means responsive to the produced pressure for moving the linearly movable means comprises a cylinder, a piston mounted in the cylinder, a piston rod carried by the piston for movement therewith and connected to the force transfer member of the linearly movable means, means for biasing the piston in one direction operable between one end of the cylinder and the piston and means connecting the other end of the piston to the produced pressure proportional to the ratio of the pressure sensed.

4. A pressure ratio indicator comprising first pressure responsive means movable in accordance with a pair of sensed pressure including a first pressure responsive bellows and a first lever pivotally mounted at one end and connected to the pressure responsive bellows at the other end, second pressure responsive means movable in accordance with one of said sensed pressures including a second pressure responsive bellows and a second lever pivotally mounted at one end and secured to the second bellows at the other end and extending at right angles to the first lever, linearly movable means operably associated with both the pressure responsive means for transferring forces between said levers at a variable location longitudinally of said first lever and at a fixed location longitudinally of said second lever, a force transfer member extending between said levers and roller means secured to and carried by the force transfer member engageable with said levers, means resposive to movement of said first lever for producing a pressure proportional to the ratio of the pressures sensed by the pressure and pressure ratio indicating means operably associated with the linearly movable means for indicating the ratio of the sensed pressures in accordance with the movement of the linearly movable means responsive means, means for moving the linearly movable means a distance linearly proportional to the ratio of the sensed pressures in direct response to the produced pressure.

5. Structure as set forth in claim 4 wherein the means for producing a pressure proportional to the ratio of the pressures sensed comprises a restricted passage connected to one of the pressures sensed and valve means at one end of the restricted passage for restricting the end opening of the restricted passage in accordance with the position of the first lever.

6. Structure as set forth in claim 4 wherein the means responsive to the produced pressure for moving the linearly movable means comprises a cylinder, a piston mounted in the cylinder, a piston rod carried by the piston for movement therewith and connected to the force transfer member of the linearly movable means, means for biasing the piston in one direction operable between one end of the cylinder and the piston and means connecting the other end of the piston to the produced pressure proportional to the ratio of the pressures sensed.

7. A pressure ratio indicator comprising first pressure responsive means movable in accordance with a pair of sensed pressures including a first lever, a second pressure responsive means movable in accordance with one of the pair of sensed pressures including a second lever extending perpendicularly to the first lever, linearly movable means operably associated with both the pressure responsive means for transferring forces between said levers at a variable position along the length of the first lever and at a fixed position along the length of the second lever, means responsive to movement of one of said levers for producing a third pressure, means responsive to the third pressure for moving the linearly movable means a distance proportional to the ratio of the sensed pressures and means for indicating the movement of the linearly movable means.

8. Structure as set forth in claim 7 wherein the second lever is substantially wider than the first lever.

References Cited by the Examiner
UNITED STATES PATENTS

| | | | |
|---|---|---|---|
| 2,764,868 | 10/1956 | Watson et al. | 60—39.28 |
| 2,848,869 | 8/1958 | Russ | 60—39.28 |
| 2,857,739 | 10/1958 | Wright | 73—407 |
| 2,937,528 | 5/1960 | Ketchum | 73—407 |
| 3,072,326 | 1/1963 | Rohmann et al. | 73—407 X |
| 3,162,047 | 12/1964 | Rosenberger | 73—407 |

LOUIS R. PRINCE, *Primary Examiner.*

ROBERT L. EVANS, RICHARD QUEISSER,
*Examiners.*